United States Patent [19]

Cormier

[11] 4,004,940
[45] Jan. 25, 1977

[54] PIGMENTATION OF POLYMERS
[75] Inventor: Claude Cormier, Sherbrooke, Canada
[73] Assignee: Celanese Canada Limited, Montreal, Canada
[22] Filed: Jan. 13, 1975
[21] Appl. No.: 540,629

Related U.S. Application Data

[63] Continuation-in-part of Ser. No. 403,150, Oct. 3, 1973, which is a continuation-in-part of Ser. No. 165,377, July 22, 1971, abandoned.
[52] U.S. Cl. ............... 106/308 M; 260/42.21; 260/42.46; 106/288 Q; 106/307
[51] Int. Cl.² ............................................. C08J 3/00
[58] Field of Search ...... 106/288 Q, 308 Q, 308 M, 106/198; 260/42.46, 42.21
[56] References Cited
UNITED STATES PATENTS
2,497,346 2/1950 Collins ........................... 260/34.2

| | | |
|---|---|---|
| 3,275,591 | 9/1966 | Tomlinson ............... 260/42.46 |
| 3,600,354 | 8/1971 | Kunze et al. ............... 106/198 |
| 3,876,608 | 4/1975 | Anderson et al. ............ 260/42.46 |

FOREIGN PATENTS OR APPLICATIONS
1,454,755 2/1969 Germany ................ 106/308 M

*Primary Examiner*—Winston A. Douglas
*Assistant Examiner*—J. V. Howard
*Attorney, Agent, or Firm*—Roderick B. Macleod

[57] ABSTRACT

There is provided an improved polypropylene/pigment concentrate for use in preparing pigmented fibers. The improvement comprises at least 95 weight percent of the polypropylene particles have a maximum chord of less than 50 microns. Fibers prepared from concentrates containing 10–75% by weight of pigment have improved color, fewer pigment agglomerates and fewer broken filaments.

5 Claims, No Drawings

PIGMENTATION OF POLYMERS

This is a continuation-in-part application of pending application Ser. No. 403,150 filed Oct. 3, 1973 which is a continuation-in-part application of application Ser. No. 165,377 filed July 22, 1971 and now abandoned.

This invention relates to a polypropylene/pigment concentrate prepared from very fine particles of polypropylene having maximum chords less than 50 microns, substantially uncontaminated by the presence of larger particles of polypropylene. The concentrate is particularly suitable, after dilution with larger particles of polypropylene, for the preparation of melt-spun polypropylene fibers.

BACKGROUND OF INVENTION

Polymer/pigment concentrates have been used for many years, both for economic reasons and for increasing the range of colors obtainable with polymers that are difficultly dyeable. Typical prior art includes the following.

U.S. Pat. No. 3,275,591 teaches the use of impact devices to partially break down pigment agglomerates in blends of pigment with polypropylene powder of undefined particle size, and exemplifies pigment concentrations of 0.5% in the concentrate.

U.S. Pat. No. 2,497,346 teaches that tumbling of fine polymer particles with dry pigment results in an unacceptable molded product because of dullness and shreaks, and that it is desirable to modify that process of spraying the mixture with just-sufficient solvent to dissolve the surface of each (nonporous) polymer particle without consolidation of the particles. It further teaches that, in this solvent process, the finer the polymer particle size the more uniform is the final color obtained and that for economical reasons it is preferable to use particles larger than 100 mesh (which has openings of 0.147 mm or 147 microns). All its examples show pigment concentrations of less than 0.5%.

U.S. Pat. No. 3,600,354 teaches that in the preparation of polymer/pigment concentrates it is desirable to (i) treat solid polymer particles to roughen and fissure their surfaces and reduce them to finely divided form, (ii) mix the treated polymer with pigment to incorporate the pigment into the fissures, and (iii) heat the mixture sufficiently to sinter the particles. The patent further teaches that it is not generally sufficient to use small chips since these will have smooth surfaces to which the polymer will not adhere sufficiently. It also teaches that although the size of the particles is not critical, best results have been obtained with sizes in the range of $10^{-5}$ to $7\times10^{-1}$ mm$^3$, preferably of $10^{-4}$ to $10^{-1}$ mm$^3$. In all the examples at least 85 weight percent particles had a maximum chord in excess of 20 microns. Further, the particles were typically in the form of long splinters or chopped fibers.

German Pat. No. 1,454,755 teaches that, for non-fiber applications, a particle size of 100 to 200 microns is adequate in the preparing of a polyethylene/pigment concentrate by dry ball milling (Example 1); and that an average particle size of 50 microns is adequate for polyvinyl chloride (Example 2).

Out of the aforementioned prior art, only U.S. Pat. No. 3,275,591 actually exemplifies polypropylene/pigment concentrates; and it fails to indicate particle size and fails to show concentrates at above 0.5% concentration. None of the forementioned prior art, whether relating to polypropylene or other polymers, either exemplifies the use of particles having an average maximum diameter of less than even 50 microns, or suggests that the presence of a small weight percentage of larger particles is harmful, but rather teaches the opposite.

SUMMARY OF THE INVENTION

In contrast to the aforementioned prior art, it has now been surprisingly discovered that small polypropylene particles with smooth, non fissured surfaces are eminently suitable for blending with pigments to form unsintered concentrates suitable for fiber applications, provided that the presence of a significant number of larger particles is deliberately excluded during the blending operation to form the concentrate. In particular, at least 95 weight percent of the polypropylene particles have a maximum chord of less than 50 microns, and preferably at least 90 weight percent of the polypropylene particles have a maximum chord or less than 25 microns. Polypropylene/pigment concentrates having high pigment concentration of 10–75%, preferably 25–50%, can be easily made and used in the preparation of pigmented polypropylene fibers having deeper color, fewer pigment agglomerates and fewer broken filaments.

DESCRIPTION AND PREFERRED EMBODIMENTS

Isotactic polypropylene polymer used in the preparation of fibers, is typically and most economically available commercially in the form of fine granules having a wide range of sizes, mainly around 200–300 microns but ranging from a few microns up to say 500 microns. In contrast to polymers such as polyesters and polyamides, polypropylene is not polymerized from a melt and apparently has not yet been pigmented during polymerization. These untreated particles typically have rounded, smooth, non-fissured surfaces.

Originally, pigmented polypropylene fibers were made by blending pigment with the forementioned polymer having a wide range of particle sizes, but with many pigments the resulting fiber contained excessive agglomerates that resulted in dull color and broken filaments, regardless of whether or not concentrates were prepared.

Then it was discoverd that, from identically the same starting materials and identically the same overall pigment concentration in the final fiber, a better polypropylene fiber could be prepared having deeper color and fewer broken filaments and fewer agglomerates, by (i) screening the given polypropylene to remove the 1% of finest particles from the 99% of coarser particles, (ii) blending these finest particles with an equal weight of pigment to give a 50/50 concentrate, (iii) blending the concentrate with the previously separated coarser particles to give a 1/100 mixture, and (iv) conventionally preparing fibers therefrom. Accordingly, it is quite clear, though surprising, that the presence of larger particles in the unblended polypropylene used to prepare the concentrate, significantly affected the properties of fibers obtained therefrom (see Examples below).

Experiments also showed that concentrates prepared from chopped fibers, rather than screened polymer fines, and having substantially the same ratio of surface area to weight of polymer as the screened polymer fines, resulted in an unacceptable fiber (see Examples below).

Accordingly, it is clear that the surface area of the unblended polypropylene polymer is not the controlling feature of the invention. The maximum chord of the particles is, however, important. At least 95 percent by weight of the polypropylene particles used to prepare the concentrate have a maximum chord of less than 50 microns, and preferably further at least 90 weight percent of the particles have a maximum chord of less than 25 microns.

The concentrates contain 10–75% by weight of pigment, preferably 25–50%.

It is preferred that the concentrate be prepared using impact devices.

The polymer used may be prepared in any manner provided that it has the particles with the required values of maximum chord.

The polypropylene fibers made in this invention have fewer agglomerates and the width of the largest agglomerates present is typically reduced by a factor of 2, from say 8 to 4 microns. Although this is not a large difference numerically, it has a major effect on the fiber properties and processability.

In general, the pigments used in this invention are of relatively small particle sizes (a micron or less) in comparison to the polypropylene particles, and particle sizes have not been found critical. Pigments that have been used are the commercial types which generally have dimensions in the order of microns or less. Surprisingly enough the pigments may be used successfully without additives to help dispersion: i.e. they may be pure pigments generally referred to in the trade as dry colors. These include, for instant:

| | |
|---|---|
| Mercadium Red X-2750 } Cadmium Yellow X-2823 } | Imperial Color supplied by Hercules Incorporated |
| Cromophtal Yellow 3G | Ciba-Geigy Co. of Switzerland |
| Irgazin Yellow 3 RLT | Ciba-Geigy Co. of Switzerland |
| Cromophtal Blue 5909 | Ciba-Geigy Co. of Switzerland |
| Cromophtal Red BR | Ciba-Geigy Co. of Switzerland |
| PV Fast Red B | Faberwerke Hoechst |
| Carbon Black 10-R | Cabot-Carbon |
| PV Fast Yellow HR | Faberwerke Hoechst |

Blends of organic and inorganic pigments work generally much better than when produced according to the prior art and this advantage is even more pronounced with high pigment concentration.

A convenient method of preparing the concentrate of this invention is to mix fines of commercially available polymer with the pigment to obtain a good distribution of the pigment, and then mill the resulting mixture to break the agglomerates, and bring the pigments on the surface of said fines; variation of said method may also be used if desired.

This concentrate may be obtained by mixing in a tumbler-type apparatus and milling, crushing or impact breaking with hammermills or by equivalent equipments. When tumbling is carried out before and after hammermilling the tumbling period may be for instance in the order of 5–20 minutes, but this order of minutes can be extended or reduced.

In accordance with this invention the pigment particles surround the polymer fines, i.e. the pigment is homogeneously dispersed, and preferentially distributed on the surface of each fine and held by surface attraction.

The following examples will now serve to illustrate embodiments of the invention.

EXAMPLE I

The Concentrate

One hundred grams each of fine "Moplen" MF. 12 flakes, (a trade-mark for isotactic polypropylene flakes) with an average particle size of about 5 microns and nominal melt flow 12.0, and of Mercadium Red X-2750 pigment (color index No. 77201). supplied respectively by Novamont Corp. and Hercules Incorporated of the U.S.A. were placed together in a 32 oz. glass jar and tumbled or mixed for a 10 minute period on a laboratory type jar tumbler. The tumbled mixture of resin and pigment was then fed by hand at an average rate of 100 grs/min. to a laboratory pulverising mill manufactured by Weber Bros. and White Metal Works Inc. of Chicago, Ill. The milling operation was repeated three times and after the third time in the mill, the resin and pigment mixture appeared very homogeneous and had a color close to that of the original pigment.

Dilution

Two percent by weight of the concentrate were added to standard grade "Profax 6301" (a trade-mark for isotactic polypropylene flakes), containing heat and UV stabilizing ingredients and adhesive ingredients, then agitated together in a jar by manually shaking the latter for a period of about 5 minutes.

Result

The pigmented polypropylene flakes thus obtained were extruded into a 6700 denier - 150 filament yarn on a Killion 1-inch laboratory extruder as per the following conditions:

| | |
|---|---|
| Screw speed: | 36 RPM |
| Metering pump speed: | 12 RPM |
| Extruder barrel temperature: | 464° F |
| Extruder yarn take-up speed: | 98 ft/min. |

The extruded yarn was drawn to 2250 denier at a temperature of 110° C and collected on a parallel wound package by means of a "Leesona Corp's No. 959" a trade-mark for a yarn winding unit.

Microscropic examination of the yarn filaments indicated that there was a uniform pigmentation and that the pigment particles in the filaments were on the average 2 microns wide in the direction perpendicular to the fiber axis.

EXAMPLE II

The Concentrate

Two hundred grams of a mixture were prepared as per the following recipe:
   6⅔ parts of fine polypropylene flakes as described in Example I.
   1⅔ parts of Mercadium Red X-2750 pigment as described in Example I.
   1 part of Cadmium Yellow X-2823 pigment (color index No. 77199) supplied by Hercules Inc. of the U.S.A.
   1.92 parts of Cromophtal Yellow 3G pigment (color index No. Pigment Yellow 93) supplied by the Ciba-Geigy Co. of Switzerland.

The ingredients were tumbled together in a 32 oz. jar for a 5 minute period. The tumbled mixture was then processed five times in the laboratory mill described in Example 1. The mixture obtained after the fifth time in the pulverising mill had a uniform orange color.

Dilution

The milled mixture obtained was then added to standard grade "Profax 6301" flakes, containing UV and heat stabilizers at a let down ratio of 72,5:1, and tumbled in a jar for 15 minutes, then agitated by hand for five minutes.

End Result

The pigmented polypropylene flakes thus obtained were processed on the same extruder and in the same conditions as mentioned in Example I and the extruded yarn was drawn to 2250 denier at 110° C. Examination of the individual filaments on the drawn yarn under a microscope indicated an average pigment particle diameter of 4 microns and uniform distribution thereof.

EXAMPLE III

The same was repeated as in Examples I and II but using a tumble mixer and a hammermill of large size capacity and a Nauta mixer. Results obtained were comparable.

Samples A, B and C

The conventional method of dispersing of mixing dry pigments in polypropylene flake via a Hammermill was used for making concentrates identical to Example I, II and III. The time required for the milling operation was several times: i.e. 5 times or more than that required for processing the new pigment concentrates of this invention as described in the Example I, II, and III. Thus, the latter allow a very substantial reduction in the total time required for preparing pigmented polypropylene for extrusion into fibers or other shaped particles, even more so with blends of pigments.

End - Product

In addition, the method as used in Examples I, II and III as compared to Samples A, B and C yielded pigment particles in the fiber produced which were at least 50% smaller in size on the average than that obtained by the conventional method (Samples A, B and C) using the same grade of polypropylene flakes. The smaller pigment particles, are highly desirable for many reasons, including:
 a. superior performance of the pigmented polymer at extrusion with much lower rates of spinpack filter plugging,
 b. higher quality and uniformity of the extruded filaments as well as better performance of the latter during the subsequent textile operations, e.g. drawings, twisting, etc., and
 c. higher coloring power per unit weight of pigment as well as better light fastness of the color obtained.

EXAMPLE IV (COMPARATIVE)

This example demonstrates that chopped fibers having an average diameter of 24 microns and an average length of 4 mm are not suitable for preparing concentrates that are not sintered before dilution and extrusion (in contrast to Example 6 of U.S. Pat. No. 3,600,354), in spite of the extremely high surface area of the fibers.

A sample of polyester yarn was chopped into 4 mm long segments thus providing a supply of individual fibers having an average length of 4 mm and an average diameter of .024 mm. The cut fibers were then washed 3 times in chloroform to remove all finish or lubricant on the fibers.

To 117 grs. of these cut and washed fibers, were added 39 grs. of the pigment Cromophtal Blue 4GN (manufactured by Ciba-Geigy). The two ingredients were tumble-blended in a 128 oz glass jar for a period of 30 minutes. The resulting mixture was very non uniform with large fiber clumps covered with pigment at their periphery only while a substantial amount of pigment remained separate from the fibers. This material as obtained after the tumbling operation was then passed through a laboratory pulverizing mill (manufactured by Weber Bros. and White Metal Works of Chicago). Serious defficulties were experienced in trying to feed the lumpy material through the mill and a large part of the pigment remained free and separate from the fibers although the latter were in a somewhat fluffier or opened state. The material obtained from the hammermill was tumble-blended again for 30 minutes in a 128 oz glass jar. The resulting material consisted again of clumps of pigmented fibers and of loose pigments unattached to the fibers. Twenty grams of the pigmented fibers and loose pigment obtained as per the procedure described above were added to 980 grs of polyester resin of I.V. 0.675 and particle size of 10 mesh average. This mixture was tumble-blended 30 minutes in a 128 oz glass jar. After the blending treatment, the mixture still appeared inhomogeneous, the colored fibers forming large clumps completely separate from the unpigmented resin particles.

The mixture obtained as described above was left in a vacuum oven at 125° C for 15 hours and then was transferred to the feed hopper of a 1 inch diameter 20:1 single screw extruded equipped with a gear type metering pump. Extrusion of the mixture was very difficult and large variations in the extrusion output rate made it impossible to draw down the extrudate to a fine textile size denier. The color of the extrudate was also unacceptably variable.

What is claimed is:
 1. An improved polypropylene/pigment essentially dry-blended concentrate being a blend of isotactic polypropylene particles and at least one pigment coated on the particles, and wherein said pigment's concentration is 10–75% by weight, wherein the improvement comprises:
  at least 95 weight percent of said polypropylene particles have a maximum chord of less than 50 microns,
 whereby fibers made therefrom have improved color, fewer pigment agglomerates and fewer broken filaments.
 2. The concentrate of claim 1 wherein at least 90 weight percent of said polypropylene particles have a maximum chord of less than 25 microns.
 3. The concentrate of claim 2 wherein said pigment's concentration is 25–50% by weight.
 4. The concentrate of claim 1 wherein said polypropylene particles have smooth unfissured surfaces.
 5. The concentrate of claim 4 wherein said particles are screened particles.

* * * * *